United States Patent
Miyoshi et al.

(10) Patent No.: US 7,891,461 B2
(45) Date of Patent: Feb. 22, 2011

(54) MOTOR ROTATION ANGLE DETECTION DEVICE

(75) Inventors: Takashi Miyoshi, Saitama (JP); Atsuhiko Yoneda, Saitama (JP); Yasuo Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 12/287,266

(22) Filed: Oct. 7, 2008

(65) Prior Publication Data

US 2009/0107756 A1 Apr. 30, 2009

(30) Foreign Application Priority Data

Oct. 25, 2007 (JP) .............................. 2007-277179

(51) Int. Cl.
 *B62D 5/04* (2006.01)
 *G01B 7/30* (2006.01)
(52) U.S. Cl. ...................... 180/443; 180/444; 180/446; 324/207.25
(58) Field of Classification Search .................. 180/443, 180/444, 446; 324/207.25
See application file for complete search history.

(56) References Cited

U.S. PATENT DOCUMENTS

| | | | |
|---|---|---|---|
| 5,565,721 | A | 10/1996 | Knappe |
| 5,955,807 | A | 9/1999 | Kajiura et al. |
| 6,118,247 | A | 9/2000 | Obayashi et al. |
| 6,340,856 | B1 | 1/2002 | Schiller |
| 7,635,046 | B2 * | 12/2009 | Tominaga et al. ............ 180/444 |
| 7,646,194 | B2 * | 1/2010 | Makino .................. 324/207.25 |
| 2006/0125334 | A1 | 6/2006 | Kataoka et al. |
| 2009/0266640 | A1 * | 10/2009 | Oshima et al. .............. 180/444 |

FOREIGN PATENT DOCUMENTS

| | | |
|---|---|---|
| EP | 0 954 092 A2 | 11/1999 |
| JP | 2001-309630 | 11/2001 |
| JP | 2002-528032 A | 8/2002 |
| JP | 2004-048925 | 2/2004 |
| JP | 2004-157056 | 6/2004 |
| JP | 2005-212722 | 8/2005 |
| JP | 2005-247079 | 9/2005 |
| JP | 2006-232062 | 9/2006 |
| JP | 2006-242758 | 9/2006 |
| JP | 2007-030741 | 2/2007 |
| JP | 2007-064870 | 3/2007 |
| JP | 2007-082285 | 3/2007 |

* cited by examiner

*Primary Examiner*—Joanne Silbermann
*Assistant Examiner*—Marc A Scharich
(74) *Attorney, Agent, or Firm*—Carrier Blackman & Associates, P.C.

(57) ABSTRACT

A motor rotation angle detection device includes a resolver which detects a rotation angle of a motor generating an assist torque for steering road wheels. The resolver includes an annular rotor disposed inside an annular stator with an air gap interposed in between an outer circumferential surface of the rotor and an inner circumferential surface of the stator, so that the stator and the rotor are rotatable relative to each other. A rotor supporting member is connected to a rotary shaft of the motor, and the rotor extends out from an axial end portion of the rotor supporting member so as to surround an outer periphery of the rotary shaft. With the described motor rotation angle detection device, it is possible to stabilize the magnetic permeability of the rotor, and accordingly to increase an accuracy with which the rotation angle of the motor is detected.

14 Claims, 8 Drawing Sheets

MOTOR ROTATION ANGLE DETECTION DEVICE

CROSS-REFERENCE TO RELATED APPLICATIONS

The present invention claims priority under 35 USC §119 based on Japanese patent application No. 2007-277179 filed 25 Oct. 2007. The subject matter of this priority document is incorporated by reference herein.

BACKGROUND OF THE INVENTION

1. Field of the Invention

The present invention relates to a motor rotation angle detection device, for detecting, using a resolver, a rotation angle of a motor generating an assist torque for steering road wheels, wherein the resolver is configured by arranging an outer circumferential surface of an annular rotor inside an inner circumferential surface of an annular stator with an air gap interposed in between, so that the stator and the rotor are rotatable relative to each other.

2. Description of the Related Art

Japanese Patent Application Laid-open No. 2005-247079 has made publicly-known an electric power steering system for assisting the steering operation of a driver by use of a torque generated by an assist motor which is operated depending on a steering torque which is inputted into a steering wheel by the driver and then is detected by a steering torque sensor.

In a case where a DC brushless motor is employed as the assist motor for the electric power steering system, it is necessary to detect a rotation angle (phase) of a rotary shaft of the assist motor for the purpose of controlling the application of currents to the U-phase, V-phase and W-phase coils of the stator of the motor. A variable reluctance resolver, generally used to detect the rotation angle, includes a stator and a rotor which are opposed to each other. The stator is fixed to a housing of the assist motor, and the rotor is provided on a rotary shaft of the assist motor. The variable reluctance resolver is designed to detect a rotation angle of the rotary shaft based on change in the air gap between the outer circumferential surface of the rotor and the inner circumferential surface of the stator. In this respect, concaves and convexes are formed on the outer circumferential surface of the rotor, and the stator is formed of multiple coils.

However, problems arise in using a resolver such as that disclosed in JP 2005-247079. For example, when the rotor is press-fitted and fixed to the rotary shaft of the assist motor, magnetic permeability becomes lower in some parts of the rotor due to residual stress caused by the press-fit. This lower magnetic permeability leads to reduction in the accuracy of the resolver in detecting the rotation angle. Moreover, when a distortion torque is applied to the rotary shaft of the assist motor, a stress is generated by the distortion torque, thus decreasing the magnetic permeability. This decrease in the magnetic permeability reduces the accuracy of the resolver in detecting the rotation angle.

SUMMARY OF THE INVENTION

The present invention has been made in view of the above circumstances, and it is an object of the present invention to prevent the rotor of the resolver from being distorted, and thus to detect the rotation angle of the motor with high accuracy.

In order to achieve the object, according to a first feature and aspect of the present invention, there is provided a motor rotation angle detection device, for detecting, by a resolver, a rotation angle of a motor generating an assist torque for steering road wheels, the resolver being configured by arranging an outer circumferential surface of an annular rotor inside an inner circumferential surface of an annular stator with an air gap being interposed in between, so that the stator and the rotor are rotatable relative to each other, wherein a rotor supporting member is connected to a rotary shaft of the motor, and the rotor is extended out from an axial end portion of the rotor supporting member so as to surround an outer periphery of the rotary shaft.

With the configuration according to the first feature and aspect of the present invention, when the rotation angle of the motor for generating the assist torque for steering the wheels is detected by use of the resolver configured by arranging the outer circumferential surface of the annular rotor inside the inner circumferential surface of the annular stator with the air gap interposed in between so that the rotor and the stator are rotatable relative to each other, it is possible to stabilize the magnetic permeability of the rotor, and accordingly to increase the accuracy with which the resolver detects the rotation angle of the motor. This happens because the rotor supporting member is connected to the rotary shaft of the motor, and because the rotor of the resolver is extended out from the axial end portion of the rotor supporting member so as to surround the outer periphery of the rotary shaft of the motor. Thereby, neither the load which occurs due to press-fitting when the rotor supporting member is connected to the rotary shaft nor the load which occurs due to torsional load acting on the rotary shaft as a result of a torque of the motor is transmitted to the rotor.

According to a second feature and aspect of the present invention, in addition to the first feature and aspect, the rotor supporting member is a coupling for connecting the rotary shaft of the motor to an input shaft of a decelerator or reduction gear.

With the configuration according to the second feature and aspect of the present invention, the rotor supporting member is configured of the coupling for connecting the rotary shaft of the motor to the input shaft of the decelerator. For this reason, the coupling can be also used as the rotor supporting member, which leads to a reduced number of parts.

According to a third feature and aspect of the present invention, in addition to the second feature and aspect, the coupling is an Oldham coupling.

With the configuration according to the third feature and aspect of the present invention, the rotary shaft of the motor is connected to the input shaft of the decelerator by use of the Oldham coupling. For this reason, an imbalanced load is prevented from being applied to the rotary shaft by causing the Oldham coupling to absorb any misalignment between the axis of the rotary shaft of the motor and the axis of the input shaft of the decelerator. Thereby, distortion of the rotor of the resolver can be further reduced to further increase the detection accuracy.

According to a fourth feature and aspect of the present invention, in addition to the second feature and aspect, the rotary shaft of the motor is connected to the coupling by press-fit.

With the configuration according to the fourth feature and aspect of the present invention, the rotary shaft of the motor is connected to the coupling by press-fit. This makes it easy to connect the rotary shaft and the coupling together. Although, on the other hand, the coupling is elastically deformed in a way that the diameter of the coupling is enlarged, the distortion of the resolver rotor can be reduced because the rotor extends from an axial end portion of the coupling so as to surround the outer periphery of the rotary shaft. Thereby, the detection accuracy can be increased.

According to a fifth feature and aspect of the present invention, in addition to the fourth feature and aspect, a diameter of an inner circumferential surface of the rotor is larger in its radial direction than a diameter of an inner circumferential surface of the coupling.

With the configuration according to the fifth feature and aspect of the present invention, although press-fit load of the rotary shaft of the motor affects the inner circumferential surface of the coupling most strongly, the configuration makes the rotor less susceptible to the influence of the press-fit load, and accordingly makes it possible for the rotation angle of the rotary shaft to be detected with accuracy. This happens because a diameter of the inner circumferential surface of the rotor is larger in its radial direction than a diameter of the inner circumferential surface of the coupling.

The above description, other objects, characteristics and advantages of the present invention will be clear from detailed descriptions which will be provided for the preferred embodiments referring to the attached drawings.

BRIEF DESCRIPTION OF THE DRAWINGS

FIG. 1 is an overall perspective view of an electric power steering system, according to a first exemplary embodiment of the present invention.

FIG. 2 is an enlarged, cross-sectional view taken along a line 2-2 in FIG. 1.

FIG. 3 is an enlarged, cross-sectional view taken along a line 3-3 in FIG. 1.

FIG. 4 is an enlarged, cross-sectional view taken along a line 4-4 in FIG. 3.

FIG. 5 is an enlarged, cross-sectional view taken along a line 5-5 in FIG. 3.

FIG. 6 is an exploded, perspective view of an Oldham coupling.

FIG. 7 is an enlarged, cross-sectional view corresponding to a view taken along a line 3-3 in FIG. 1, but according to a second exemplary embodiment of the present invention.

FIG. 8 is a perspective view of a coupling, according to the second exemplary embodiment of the present invention.

DESCRIPTION OF THE PRESENT EMBODIMENTS

A first exemplary embodiment of the present invention will be described based on FIGS. 1 to 6.

Figure 1:
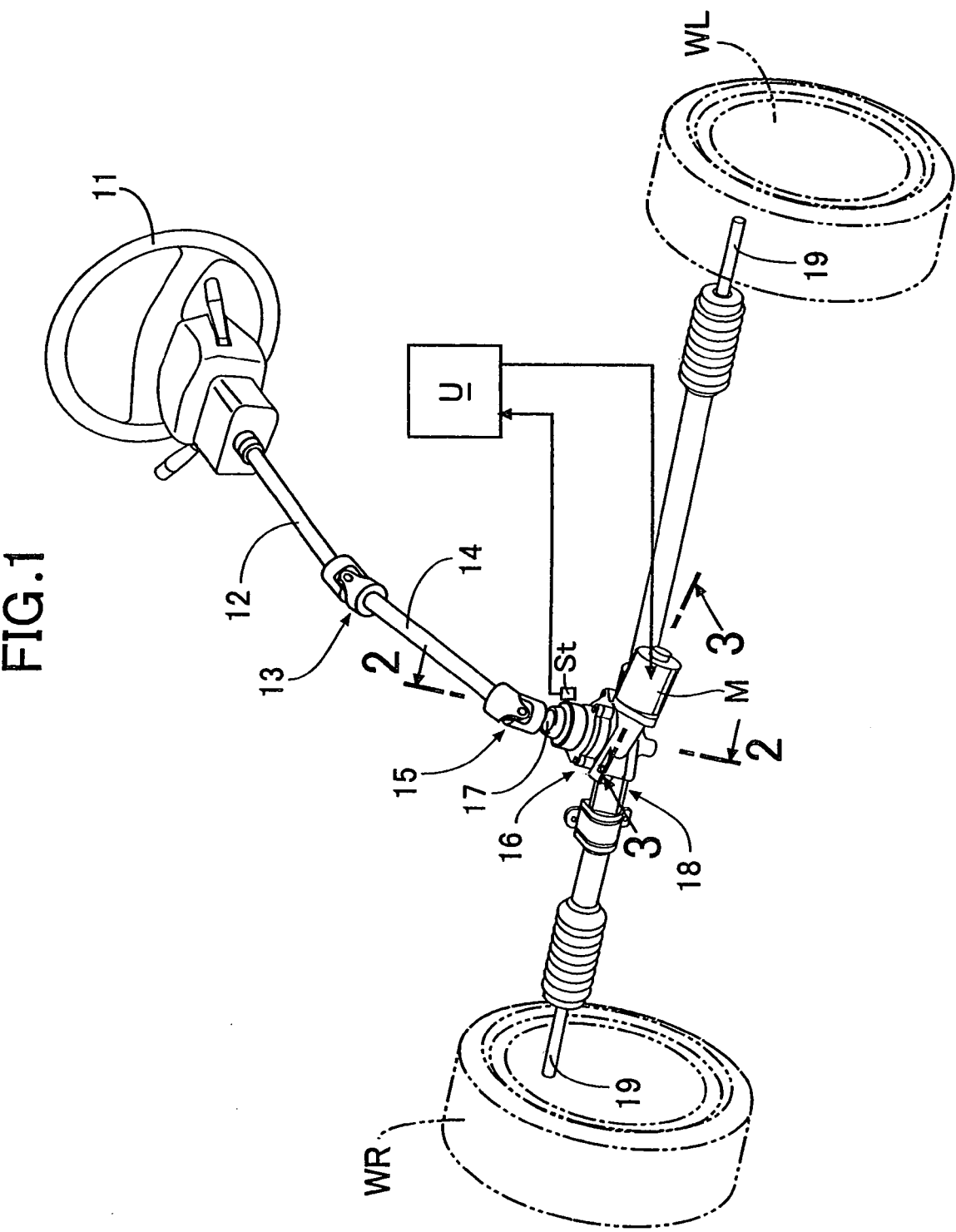
FIGS. 1 to 6 show a first exemplary embodiment of the present invention.

As shown in FIG. 1, an upper steering shaft 12, designed to rotate together with a steering wheel 11, is connected to a pinion shaft 17 protruding from a decelerator or reduction gear 16 via an upper universal joint 13, a lower steering shaft 14 and a lower universal joint 15. Tie rods 19, 19 protruding from left and right ends of a steering gear box 18 connected to the bottom tip of the decelerator or reduction gear 16 are connected to unillustrated knuckles of the left and right road wheels WL, WR. An assist motor M, configured of a DC brushless motor, is supported by the decelerator or reduction gear 16. The operation of this assist motor M is controlled by an electronic control unit U into which a signal is inputted from a steering torque detecting device St housed in the decelerator or reduction gear 16.

Figure 2:
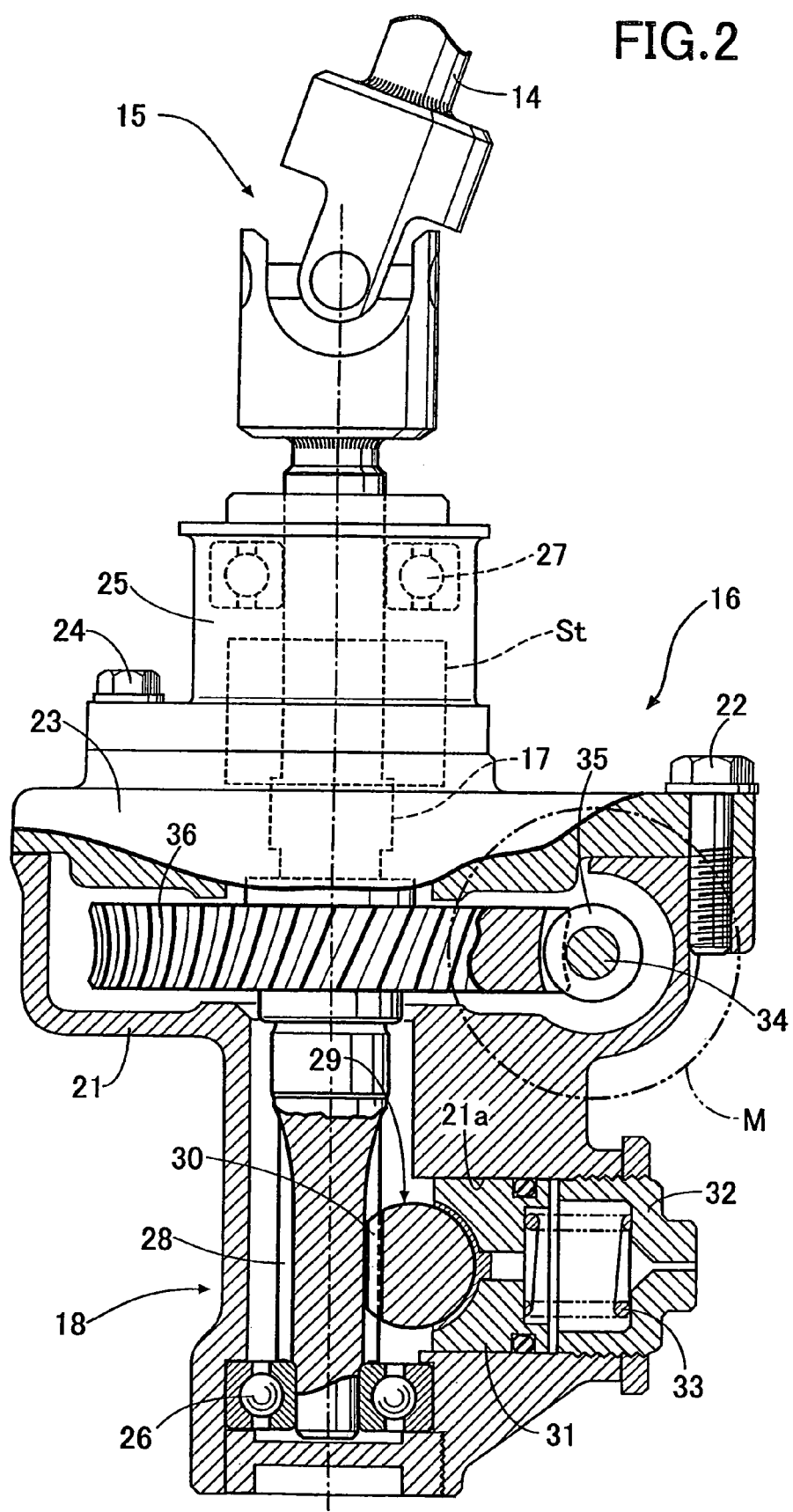
Figure 3:
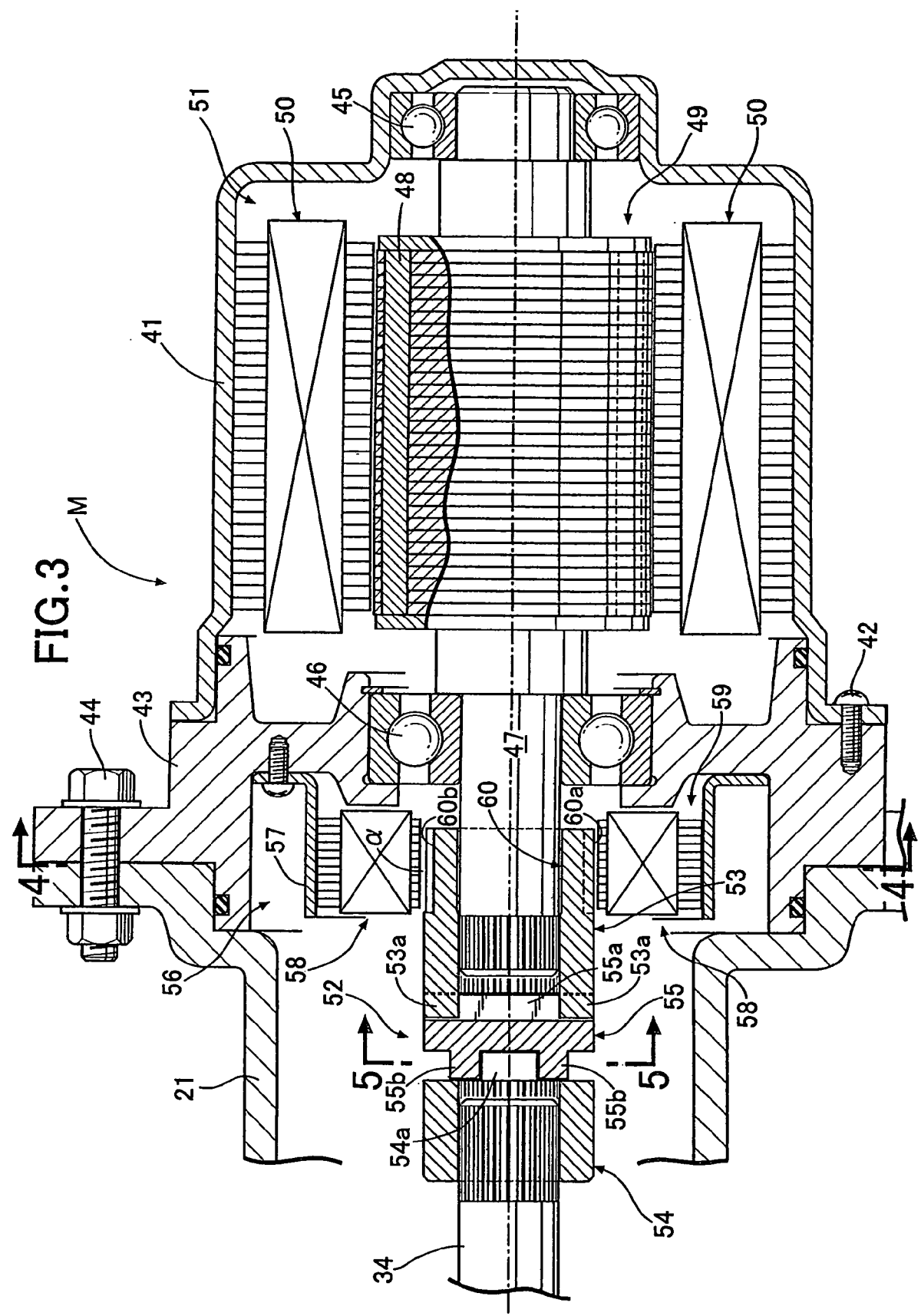
Figure 4:
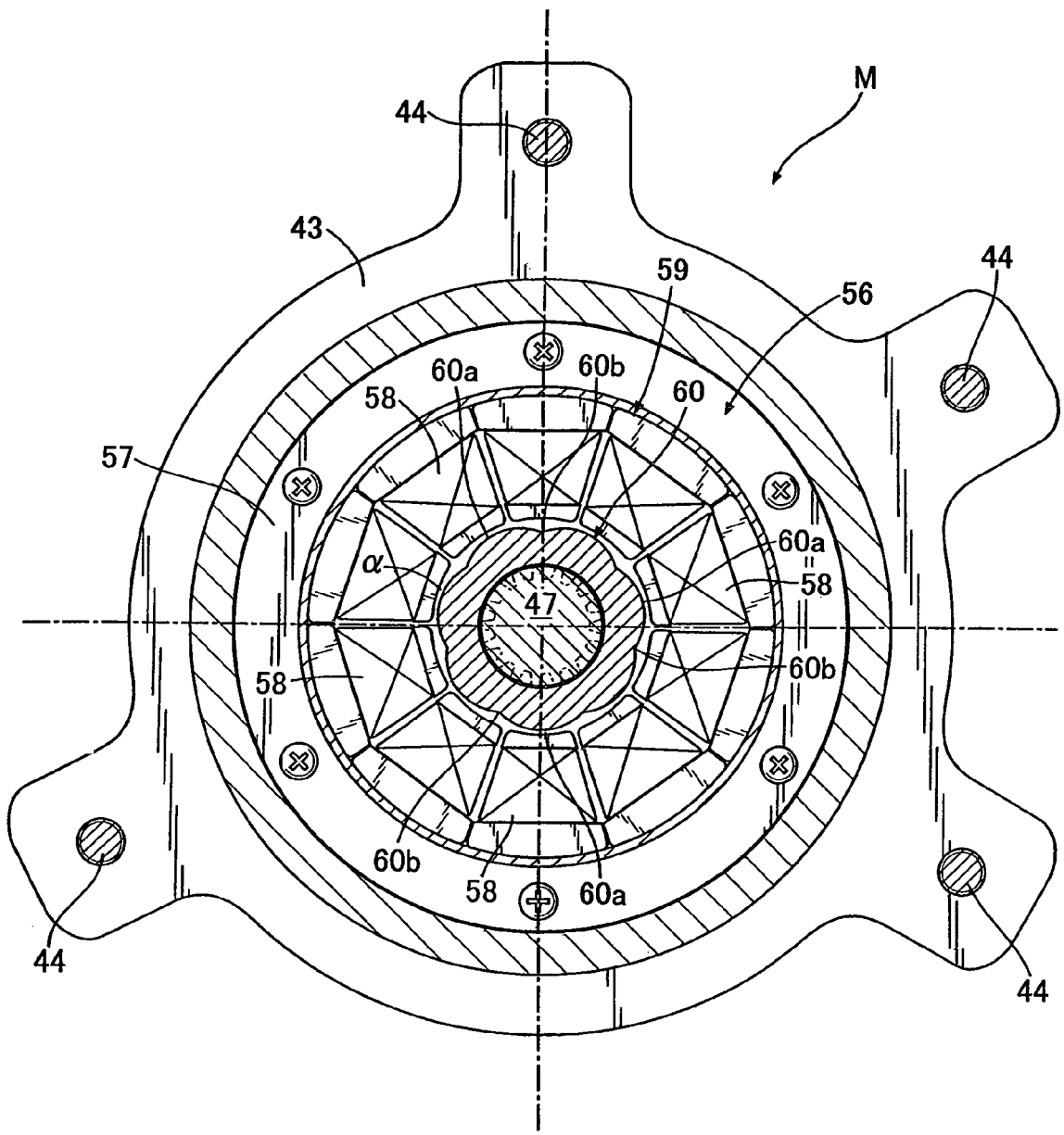
Figure 5:
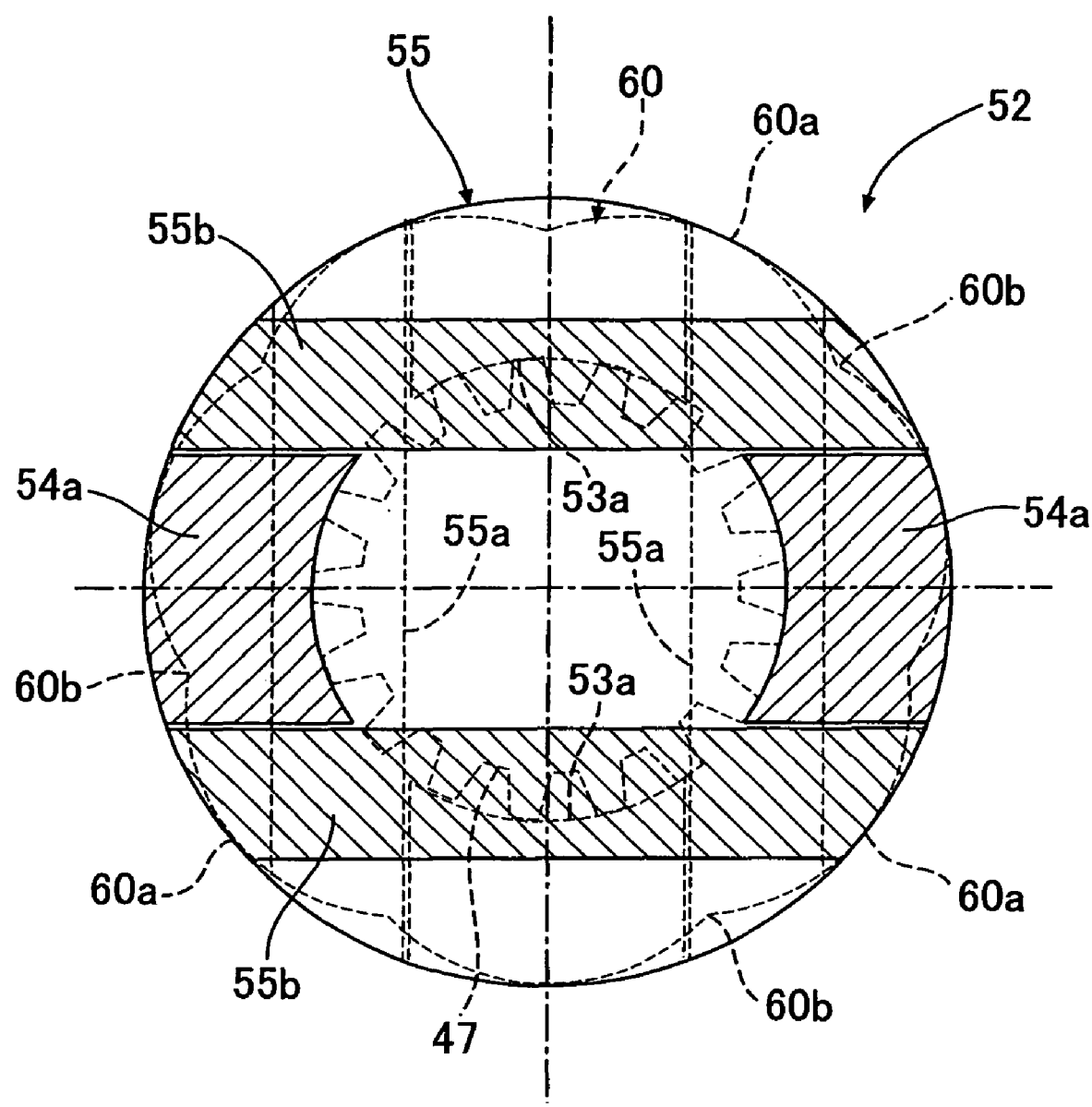
Figure 6:
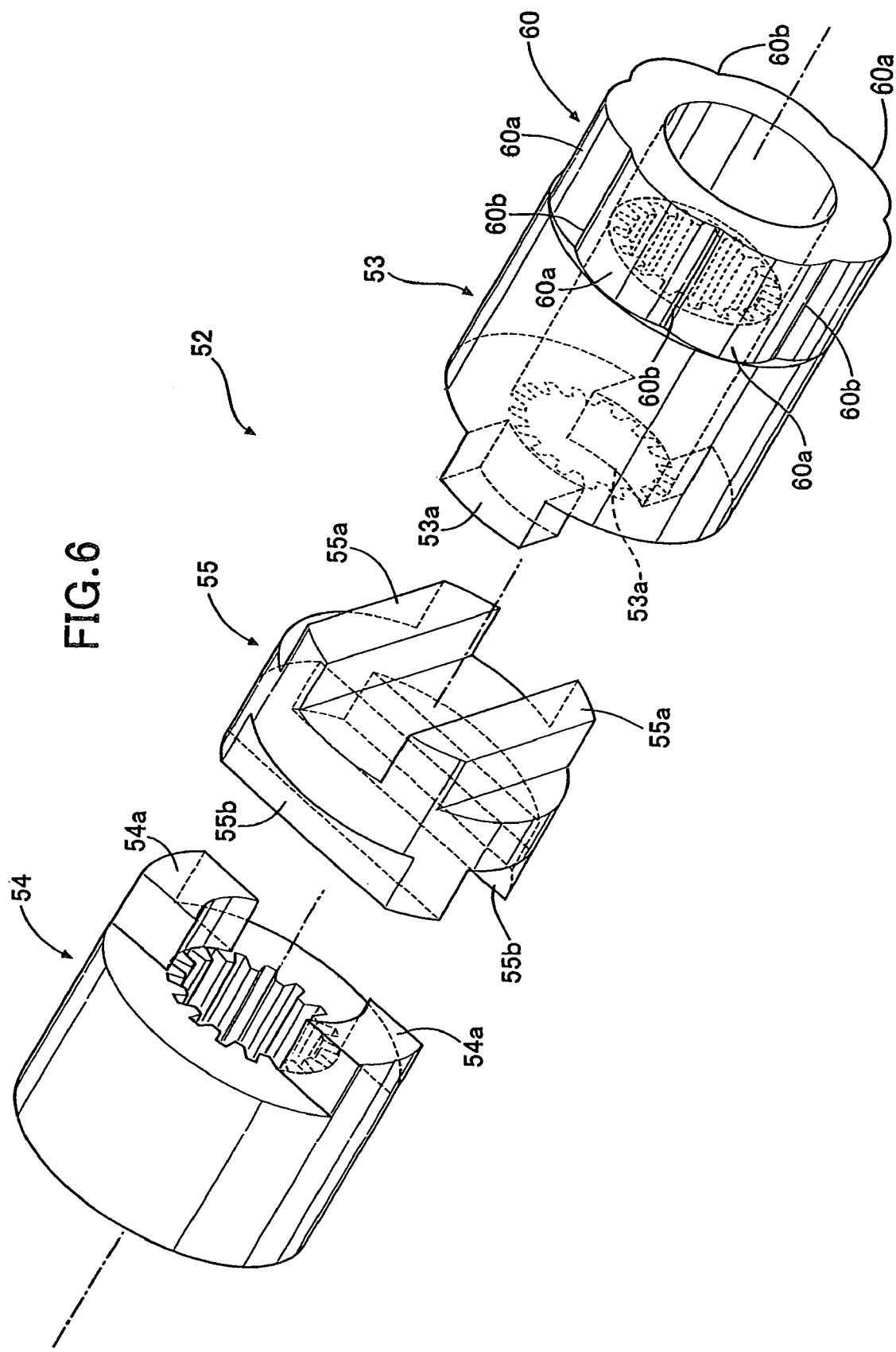

As shown in FIG. 2, the decelerator 16 includes: a lower housing 21 integrated with the steering gear box 18; an intermediate housing 23 connected to the top surface of the lower housing 21 with bolts 22; and an upper housing 25 connected to the top surface of the intermediate housing 23 with bolts 24. The pinion shaft 17 is rotatably supported by the lower housing 21 with a ball bearing 26 being interposed in between, and also is rotatably supported by the upper housing 25 with a ball bearing 27 being interposed in between. A pinion 28, provided at the bottom tip of the pinion shaft 17, meshes with a rack 30 provided on a rack bar 29 which travels leftward and rightward inside the steering gear box 18. A substantially cylindrical rack guide 31 is slidably contained in a guide hole 21a, which has a circular cross-section. The guide hole 21a is formed in the lower housing 21, and constitutes a part of the structure of the steering gear box 18. A pressing surface of the rack guide 31 is biased toward a rear of the rack bar 29 by use of a spring 33 arranged between a concave part formed in the rack guide 31 and a concave part formed in a nut member 32 for closing the guide hole 21a. This makes it possible to restrain the bend of the rack bar 29, and thus to cause the rack 30 to mesh with the pinion 28 tightly.

A worm 35 provided to an input shaft 34, which extends into the inside of the decelerator 16, meshes with a worm wheel 36 fixed to the pinion shaft 17. For this reason, once the assist motor M is driven, the pinion shaft 17 of the decelerator 16 rotates via the worm wheel 36 which meshes with the worm 35 provided to the input shaft 34 of the assist motor M, and thus the rack 30, which meshes with the pinion 28, is driven. Thereby, the steering torque, which a driver applies to the steering wheel 11, is assisted by the assist motor M.

As shown in FIGS. 3 to 6, the outer covering of the assist motor M is configured to include: a bottomed cylindrical motor housing 41; and an attachment flange 43 fixed to the motor housing 41 with multiple bolts 42 in such a way as to close the opening end of the motor housing 41. The attachment flange 43 is fastened to the lower housing 21 with multiple bolts 44. A rotary shaft 47 of the motor M is rotatably supported by paired ball bearings 45, 46 which are respectively provided to the motor housing 41 and the attachment flange 43. A column-shaped rotor 49 is fixed to the outer circumferential surface of the rotary shaft 47. Inside the rotor 49, multiple permanent magnets 48 are arranged in the circumferential direction of the rotor 49. A stator 51 is fixed to the inner circumferential surface of the motor housing 41. The stator 51 is configured to include multiple coils 50 which are arranged in the circumferential direction of the stator 51.

The rotary shaft 47 of the assist motor M and the input shaft 34 of the decelerator 16 are connected together by use of an Oldham coupling 52. The Oldham coupling 52 is configured including: a metallic first hub 53 to which the front end of the rotary shaft 47 is connected by spline connection; a metallic second hub 54 to which the front end of the input shaft 34 is connected by spline connection; and a synthetic-resin-made insert 55 held between the first and second hubs 53, 54.

Paired parallel first guide plates 55a, 55a are projected on a side surface of the insert 55. Paired parallel second guide plates 55b, 55b are projected on the other side surface of the insert 55 in such a way as to be orthogonal to the first guide plates 55a, 55a. First projections 53a, 53a are formed in the first hub 53, and slidably guide the paired first guide plates 55a, 55a of the insert 55. Second projections 54a, 54a are formed in the second hub 54, and slidably guide the paired second guide plates 55b, 55b of the insert 55.

For this reason, even in a case where the axis of the rotary shaft 47 of the assist motor M and the axis of the input shaft 34 of the decelerator 16 have unparallel misalignment, a periodic bending moment can be prevented from acting on the rotary shaft 47 and the input shaft 34. This happens because the torque can be transmitted from the rotary shaft 47 to the input shaft 34 while absorbing the unparallel misalignment by causing the insert 55 to slide over the first and second hubs 53, 54 in the respective two directions which are orthogonal to each other.

A resolver 56 is supported by a retainer 57 inside the attachment flange 43 of the assist motor M. The resolver 56 detects a rotation angle of the rotor 49 of the assist motor M, and thereby controls the phases of the U-phase, V-phase and W-phase currents supplied to each coil 50 of the stator 51 depending on the rotation angle detected.

The resolver 56 is a variable reluctance type, and is configured to include a stator 59 and a rotor 60. The stator 59 comprises multiple coils 58 (10 coils in the present exemplary embodiment) fixed to the inner circumferential surface of the attachment flange 43. The rotor 60 is configured in such a way as to be integrated with the first hub 53 of the Oldham coupling 52, and is configured of a cylindrical magnetic material which is opposed to the inner circumferential surface of the stator 59 by an air gap α. The rotor 60 is a short cylindrical member in which multiple convex parts (7 convex parts in the present exemplary embodiment) 60a and multiple concave parts (7 concave parts in the present exemplary embodiment) 60b are alternately formed. The rotor 60 protrudes from the assist-motor-M-side end portion of the first hub 53 of the Oldham coupling 52 in the axial direction with a gap being interposed between the rotor 60 and the outer periphery of the rotary shaft 47. Furthermore, the air gap α formed between the outer circumferential surface of the rotor 60 and the inner circumferential surface of the stator 59 is narrow in the convex parts 60a and is wide in the concave parts 60b.

Note that first hub 53 and the coupling 61 of the exemplary embodiments disclosed herein correspond to the rotor supporting member of the present invention, and assist motor M of the exemplary embodiments corresponds to the motor of the present invention.

Next, descriptions will be provided for how this exemplary embodiment of the present invention including the foregoing configuration operates.

Once the driver operates the steering wheel 11, the steering torque is transmitted to the rack 30 via the upper steering shaft 12, the upper universal joint 13, the lower steering shaft 14, the lower universal joint 15, the pinion shaft 17 and the pinion 28. Thus, the steering torque transmitted drives the rack bar 29 leftward or rightward inside the steering gear box 18. At this time, if the assist motor M operates, the assist torque is transmitted to the pinion shaft 17 via the worm 35 and the worm wheel 36, and thus assists the steering operation of the driver.

When the rotary shaft 47 of the assist motor M rotates, the rotor 60 of the resolver 56 integrated with the first hub 53 of the Oldham coupling 52 fixed to the rotary shaft 47 rotates, and the air gap α, located between the stator 59 and the alternate series of convex parts 60a and concave parts 60b which are arranged in the outer periphery of the rotor 60, changes its width periodically. When change in the magnetic property is outputted as a serrate voltage waveform, the rotational position of the rotary shaft 47 can be detected.

Once the resolver 56 detects the rotation angle of the rotary shaft 47 of the assist motor M, the phases of the respective U-phase, V-phase and W-phase currents of the DC brushless motor are controlled depending on the rotation angle detected. At this time, if the rotor 60 of the resolver 56 was to be hypothetically, directly fitted to the outer periphery of the rotary shaft 47 of the assist motor M by press-fit, it is likely that stress may act on the rotor 60, and that the magnetic permeability may accordingly decrease in some parts of the rotor 60. In addition, the rotary shaft 47 of the assist motor M would be distorted and deformed due to the torque. The distortion angle constantly changes depending on the torque. Moreover, when the rotary shaft 47 of the assist motor M and the input shaft 34 of the decelerator 16 are not fully coaxially arranged, a periodic bending moment acts on the rotary shaft 47. These factors may cause a triangular waveform, which is outputted from the resolver 56, to be out of shape, and that the cycle may change. Such factors make it likely that the rotation angle of the rotary shaft 47 of the assist motor M may not be detected with accuracy.

By contrast, in the present exemplary embodiment, the rotary shaft 47 of the assist motor M is connected to the first hub 53 of the Oldham coupling 52 by spline-connection, and the rotor 60 of the resolver 56 is arranged to extend out from the end surface of the first hub 53 so as to surround the outer periphery of the rotary shaft 47 with the gap being interposed in between. For this reason, the rotor 60 is no longer directly affected by the stress coming from the press-fitting of the rotary shaft 47 and the stress coming from the torsion of the rotary shaft 47. In addition, the influence of the stress coming from the press-fitting of the rotor 60 and the influence of the stress coming from the torsion of the rotary shaft 47 are eliminated. Thereby, the rotation angle of the rotary shaft 47 can be detected with accuracy. Moreover, because the rotor 60 is supported by use of the first hub 53 of the Oldham coupling 52, specialized members for supporting the rotor 60 are no longer necessary, leading to a reduced number of parts.

Furthermore, because the Oldham coupling 52 is arranged between the rotary shaft 47 and the input shaft 34, the rotary shaft 47 can smoothly transmit the driving force of the assist motor M to the decelerator 16 without receiving the periodic bending load even when the axis of the rotary shaft 47 and the axis of the input shaft 34 have the unparallel misalignment. As a result, the bending moment is no longer directly transmitted to the rotor 60 of the resolver 56 and the rotor 60 is prevented from making a twisting rotational motion. By this, the rotation angle of the rotary shaft 47 can be detected with higher accuracy.

Figure 7:
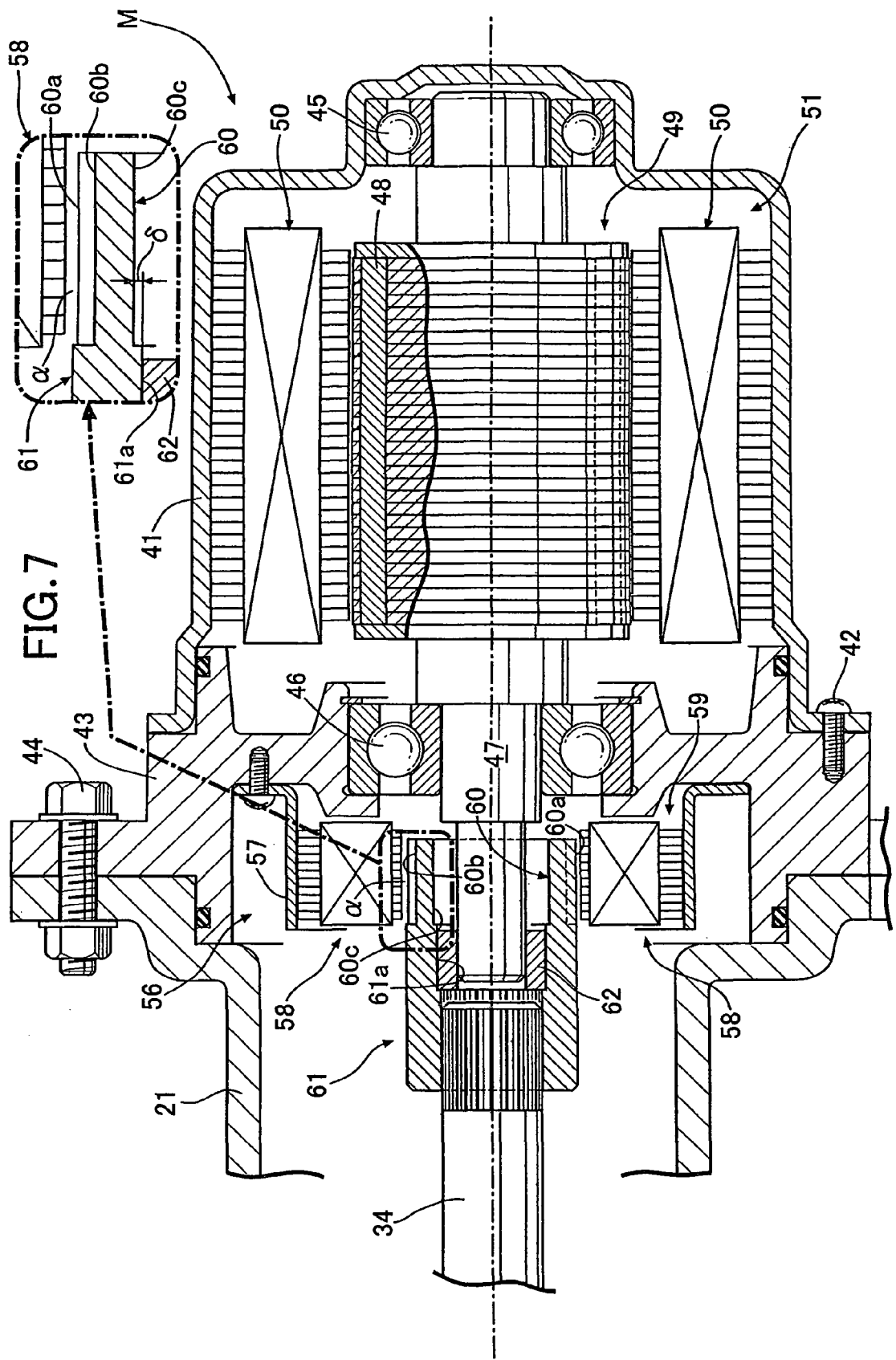
FIGS. 7 and 8 show a second exemplary embodiment of the present invention.
Figure 8:
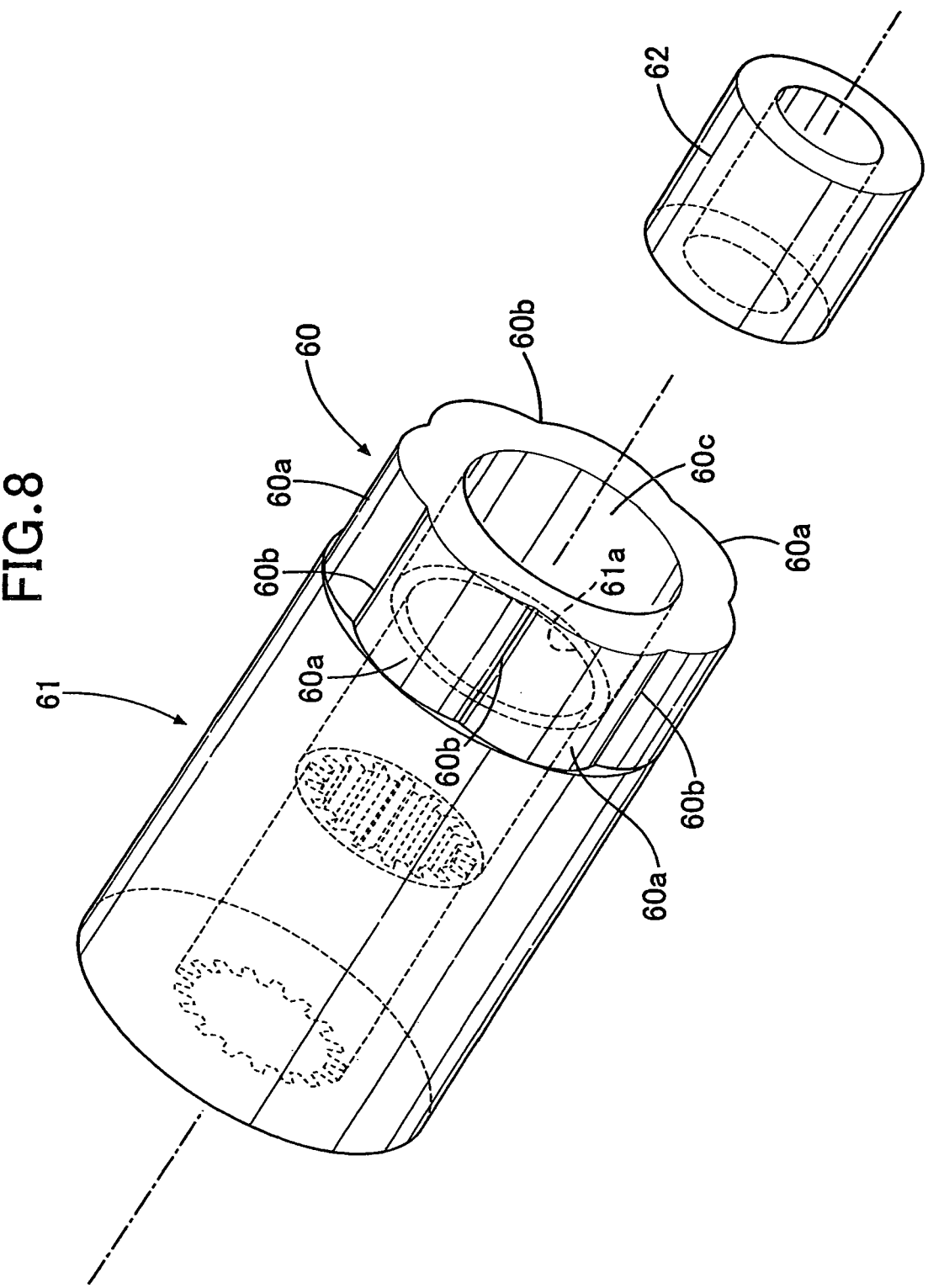

Next, descriptions will be provided for a second exemplary embodiment of the present invention with reference to FIGS. 7 and 8.

In the first exemplary embodiment, the rotary shaft 47 of the assist motor M and the input shaft 34 of the decelerator 16 are connected together by use of the Oldham coupling 52. By contrast, the second exemplary embodiment adopts a cylindrical coupling 61 in lieu of the Oldham coupling 52. A collar 62 is fitted to an end side of the coupling 61 by press-fit, and the front end of the rotary shaft 47 of the assist motor M is fitted into the collar 62 by press-fit. In addition, the input shaft 34 of the decelerator 16 is connected to the other end side of the coupling 61 by spline-connection.

The rotor 60 of the resolver 56 extends from an end portion of the coupling 61 in the axial direction in such a way as to surround the outer periphery of the rotary shaft 47. In this respect, a diameter of the inner circumferential surface 60c of the rotor 60 is larger in its radial direction with a distance δ than a diameter of the inner circumferential surface 61a of the coupling 61 into which the collar 62 is fitted by press-fit.

According to the second exemplary embodiment, the rotation angle of the rotary shaft 47 can be detected with accuracy even if the coupling 61 is deformed due to the press-fitting of the rotary shaft 47 of the assist motor M. This happens because neither stress coming from the press-fit nor stress coming from the torque of the assist motor M is transmitted to the rotor 60, which is formed so as to extend out from the end surface of the coupling 61. Furthermore, although the press-fit load of the rotary shaft 47 affects the inner circumferential surface 61a of the coupling 61 most strongly, the rotor 60 is less susceptible to the influence of the press-fit load because the inner circumferential surface 60c of the rotor 60 is separated away from the inner circumferential surface 61a of the coupling 61 outward in the radial directions with the distance δ in between. Thereby, it is possible to detect the rotation angle of the rotary shaft 47 with accuracy.

The foregoing descriptions have been provided for the exemplary embodiments of the present invention. However, the present invention is not limited to the above exemplary embodiments. Various design modifications can be carried out without departing from the present invention set forth in the scope of claims.

For example, the present invention may be applied to a cable steering apparatus and a steer-by-wire steering apparatus, although the shaft steering apparatus has been exemplified for the exemplary embodiments.

Further, as to the resolver 56, the number of poles of the stator 59 and the number of poles of the rotor 60 can be changed depending on the necessity.

What is claimed is:

1. A motor rotation angle detection device, comprising:
a resolver which is operable to detect a rotation angle of a motor generating an assist torque for steering road wheels, the resolver including an annular rotor disposed inside an annular stator with an air gap interposed between an outer circumferential surface of the rotor and an inner circumferential surface of the stator, so that the stator and the rotor are rotatable relative to each other, wherein
a rotor supporting member is connected to a rotary shaft of the motor, wherein the rotor supporting member and the rotor are integrally formed as portions of a unitary member, and
the rotor extends out from an axial end portion of the rotor supporting member so as to surround an outer periphery of the rotary shaft in a manner such that an internal gap is formed between an inner circumferential surface of the rotor and an outer circumferential surface of the rotary shaft which is opposed to the inner circumferential surface of the rotor in a radial direction.

2. The motor rotation angle detection device according to claim 1, wherein the rotor supporting member comprises a component of a coupling for connecting the rotary shaft of the motor to an input shaft of a decelerator.

3. The motor rotation angle detection device according to claim 2, wherein the coupling is an Oldham coupling.

4. The motor rotation angle detection device according to claim 2, wherein the rotary shaft of the motor is connected to the coupling by press-fit.

5. The motor rotation angle detection device according to claim 4, wherein the coupling is a cylindrical coupling.

6. A steering device, comprising:
a steering wheel;
a steering shaft;
a pinion shaft;
a reduction gear;
a steering gear box; and
a motor rotation angle detection device, comprising:
a resolver which is operable to detect a rotation angle of a motor generating an assist torque for steering road wheels, the resolver including an annular rotor disposed inside an annular stator with an air gap interposed between an outer circumferential surface of the rotor and an inner circumferential surface of the stator, so that the stator and the rotor are rotatable relative to each other, wherein
the steering wheel is configured to rotate together with the steering shaft which is connected to the pinion shaft, said pinion shaft protruding from said reduction gear,
a rotor supporting member is connected to a rotary shaft of the motor, wherein the rotor supporting member and the rotor are integrally formed as portions of a unitary member, and
the rotor extends out from an axial end portion of the rotor supporting member so as to surround an outer periphery of the rotary shaft in a manner such that an internal gap is formed between an inner circumferential surface of the rotor and an outer circumferential surface of the rotary shaft which is opposed to the inner circumferential surface of the rotor in a radial direction.

7. The steering device according to claim 6, wherein the rotor supporting member comprises a component of a coupling for connecting the rotary shaft of the motor to an input shaft of the reduction gear.

8. The steering device according to claim 7, wherein the coupling is an Oldham coupling.

9. The steering device according to claim 7, wherein the rotary shaft of the motor is connected to the coupling by press-fit.

10. The steering device according to claim 9, wherein the coupling is a cylindrical coupling.

11. A motor rotation angle detection device, comprising:
a resolver which is operable to detect a rotation angle of a motor generating an assist torque for steering road wheels, the resolver including an annular rotor disposed inside an annular stator with an air gap interposed in between an outer circumferential surface of the rotor and an inner circumferential surface of the stator, so that the stator and the rotor are rotatable relative to each other, wherein
a rotor-supporting member is connected to a rotary shaft of the motor, and
the rotor extends out from an axial end portion of the rotor-supporting member so as to surround an outer periphery of the rotary shaft,
wherein the rotor-supporting member comprises a component of a coupling for connecting the rotary shaft of the motor to an input shaft of a decelerator, and wherein the coupling is an Oldham coupling.

12. The motor rotation angle detection device according to claim 11, wherein the rotary shaft of the motor is connected to the coupling by press-fit.

13. The motor rotation angle detection device according to claim 12, wherein the Oldham coupling is a substantially cylindrical coupling.

14. A motor rotation angle detection device, comprising:
a resolver which is operable to detect a rotation angle of a motor generating an assist torque for steering road wheels, the resolver including an annular rotor disposed inside an annular stator with an air gap interposed in between an outer circumferential surface of the rotor and an inner circumferential surface of the stator, so that the stator and the rotor are rotatable relative to each other, wherein
a rotor supporting member is connected to a rotary shaft of the motor, and
the rotor extends out from an axial end portion of the rotor supporting member so as to surround an outer periphery of the rotary shaft in a manner such that an internal gap is formed between an inner circumferential surface of the rotor and an outer circumferential surface of the rotary shaft which is opposed to the inner circumferential surface of the rotor in a radial direction.

* * * * *